(No Model.)
L. W. HUYCK.
ATTACHMENT FOR SPINNING SPINDLES.
No. 471,976. Patented Mar. 29, 1892.
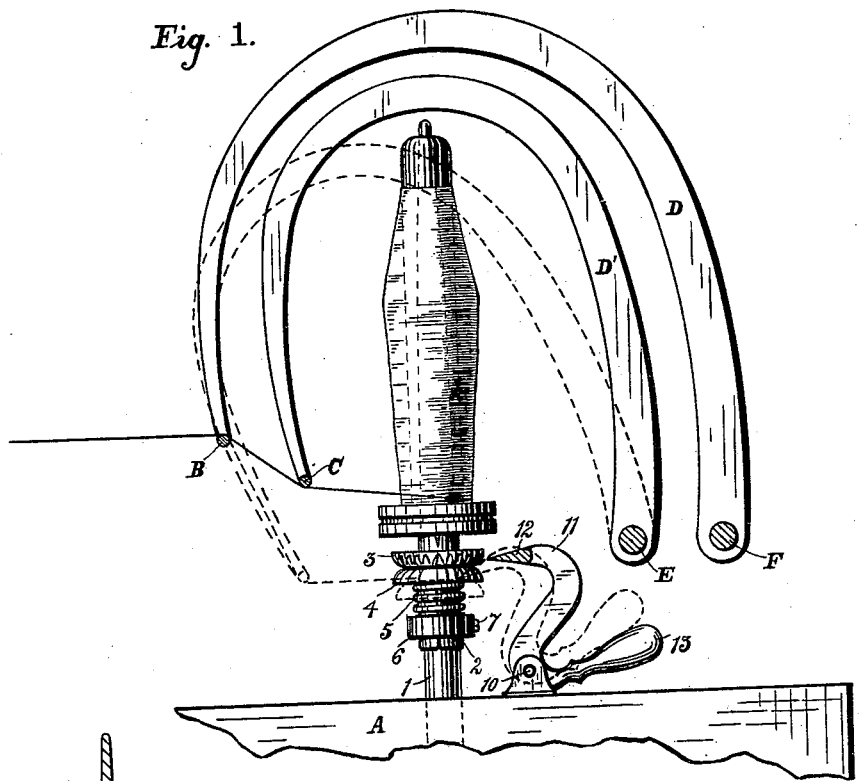
Fig. 1.
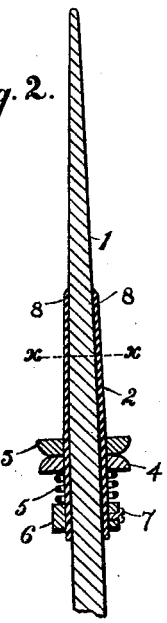
Fig. 2.
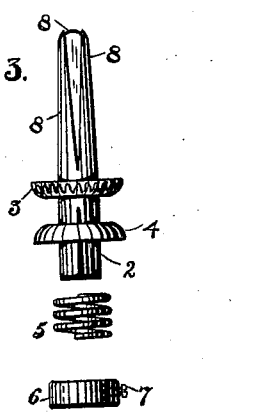
Fig. 3.
Fig. 4.
WITNESSES:
Ida C. Barnard
Alvan Macauley
INVENTOR,
Leonard W. Huyck
BY
Church & Church
his ATTORNEYS

UNITED STATES PATENT OFFICE.

LEONARD W. HUYCK, OF ROCHESTER, NEW YORK, ASSIGNOR OF ONE-HALF TO ETHAN ALLEN, OF SAME PLACE.

ATTACHMENT FOR SPINNING-SPINDLES.

SPECIFICATION forming part of Letters Patent No. 471,976, dated March 29, 1892.

Application filed May 4, 1891. Serial No. 391,523. (No model.)

*To all whom it may concern:*

Be it known that I, LEONARD W. HUYCK, of Rochester, in the county of Monroe and State of New York, have invented certain new and useful Improvements in Attachments for Spinning-Spindles; and I do hereby declare the following to be a full, clear, and exact description of the same, reference being had to the accompanying drawings, forming a part of this specification, and to the figures and letters of reference marked thereon.

My present invention has for its objects to provide an attachment for spindles which shall facilitate the removal of full and the application of empty bobbins without the waste and annoyance the present method and devices entail, and as well to provide an improved "packing" for the bobbins, simple and cheap in construction, and admirably adapted to the purpose; and to these and other ends the invention consists in certain improvements in construction and combinations of parts, all as will be hereinafter described, and the novel features pointed out in the claims at the end of this specification.

In the drawings, Figure 1 is a side view of a spindle in a mule-frame, showing the application of my invention; Fig. 2, a vertical section of the spindle and attachments; Fig. 3, a view of the parts of my attachment separated; Fig. 4, a sectional view on the line $x$ $x$ of Fig. 2.

Similar numerals and letters of reference in the several figures indicate similar parts.

Referring particularly to Fig. 1, A indicates a portion of the carriage of a mule carrying the spindle-operating devices, and the faller-wires B C, supported on arms D D', on shafts E and F, respectively.

1 indicates the spindle, of the usual construction, upon which slightly above the top of the carriage is secured a sleeve 2, preferably split longitudinally near its lower end and provided with a stationary collar or ring 3, beveled and preferably slightly roughened on the beveled edge, as shown. Arranged on the sleeve 2, below collar 3, is a collar 4, preferably having a corresponding beveled edge and held normally pressed against collar 3 by a spring 5, confined on the sleeve by a collar 6, held in position by a screw 7, passing through it and engaging the sleeve 2, said screw serving not only to hold the collar in place, but also to clamp the sleeve 2 tightly to the spindle, thus providing a simple and secure means of attachment.

The portion of the sleeve 2 extending above the collar 3 is formed into a number of projections or tongues 8, each of which are somewhat rounded on the outer side and slightly flattened, so as to bear on the spindle within at their centers, as in Fig. 4. This construction insures the proper gripping of the bobbin when placed on the spindle by the edges of the tongues, while the pressure of the tongues on the inner surface of the bobbin will be lateral rather than longitudinal, by which arrangement the tongues will not be as liable to lose their elasticity and permit the bobbin to come loose, as if they were flexed in the direction of their length. This device I term the "packing" for the bobbin.

A suitable shaft 10 is arranged in bearings upon the top of the mule-carriage A, and at suitable intervals upon it are fastened arms 11, bearing at their outer ends a blade or wire 12, preferably tapering in cross-section with its sharp edge toward the spindles, as shown, and extending the whole or a portion of the length of the carriage, so that when moved inward it will pass between and separate the two collars 3 and 4, when they may be held separated, if desired. I have shown a handle 13 on this shaft for rocking it and causing the separation of the clamping-jaws; but this is only one form of operating device and any other could as well be used. In practice the shaft-operating devices, which may consist of a worm or a worm-wheel, are preferably located at the center of the carriage, convenient for the spinner operating the mule.

While I have shown the longitudinal wire or blade as the means for causing the separation of the clamping-jaws on the spindle by passing wedge like between them, this is obviously merely one means for accomplishing the purpose; and also I do not wish to be confined to a clamp on the spindle having one stationary and one movable jaw, as they both could be made movable by merely duplicating the construction of the lower one.

It will be seen that my attachment, embodying not only a yarn-clamp but a bobbin-packing as well, is a separate structure and can be applied to spindles now in use without altering their construction; and it will be understood that the bobbin-packing could be dispensed with and the yarn-clamp alone made and supplied to factories at a slight cost, nevertheless effecting a great saving in yarn and in the time usually required in removing and applying bobbins. Again, the improved packing employed by me could be made separate, and a great economy in yarn and time effected without requiring the employment of special bobbins, which latter have been proposed to avoid using the yarn for packing.

The manner of using my invention will now be apparent. When the bobbins have become full of yarn and it is desired to remove them, the operator stops the carriage, turns the blade 12 to the position in dotted lines, Fig. 1, opening the jaws of all the spindles, then depresses the upper faller-wire C and rotates the spindles a portion or a whole revolution, which will cause the yarn to draw down into the space between the jaws 3 and 4. The wire 12 is then moved back and the jaws permitted to come together again, grasping the yarn, after which the full bobbins are pulled off the spindles, breaking the yarn and leaving the ends between the jaws. Now the empty bobbins are placed on the spindles and securely held by the fingers or tongues 8, constituting the packing, and the fallers operated so that the yarn will draw onto the bobbins for a few turns until sufficiently secured, after which the usual operation of the mule may be proceeded with. If desired to release the ends of the yarn from the jaws after being secured to the bobbins, the blade or wire 12 can be moved in, opening the jaws, when the ends will fly out from between them by centrifugal force.

Of course numerous modifications will at once suggest themselves to those skilled in the art, and I therefore do not desire to be confined to precisely the construction of parts shown.

I claim as my invention—

1. The combination, with the spindle, of the yarn-holding jaws thereon, the spring for holding said jaws normally closed, and a device mounted on the spindle-support arranged to be moved, so as to co-operate with and separate said jaws when desired, against the tension of the spring without stopping the spindle, substantially as described.

2. The combination, with the spindle, of the yarn-holding jaws thereon, the spring for holding them normally closed, and the blade adapted to co-operate with said jaws to separate them against the tension of the spring, substantially as described.

3. The combination, with the spindle, of the yarn-holding jaws thereon having the beveled edges, the spring for holding them normally closed, and the blade mounted on the spindle-support for co-operating with and separating said jaws, substantially as described.

4. The combination, with the spindle, of the stationary jaw thereon and the movable spring-operated jaw co-operating therewith, the former having the beveled edges, substantially as described.

5. The combination, with the spindle, of the removable sleeve secured thereon having the stationary jaw and the movable spring-pressed jaw, said jaws having the beveled edges, substantially as described.

6. The combination, with the spindle, of the sleeve secured thereon having the spring-bobbin-holding fingers engaging the spindle at the center and having the free edges for engaging the bore of a bobbin, substantially as described.

7. As an article of manufacture, a yarn-holder adapted to be applied to a spindle, consisting of a sleeve having the jaws thereon, one being provided with the beveled edge, and a spring for holding the jaws together, substantially as described.

8. As an article of manufacture, a yarn-holder adapted to be applied to a spindle, consisting of a sleeve having the stationary jaw thereon, the sliding jaw, a spring for moving the latter, and a clamping device for securing said sleeve removably to a spindle, substantially as described.

9. As an article of manufacture, a yarn-holder adapted to be applied to a spindle, consisting of a sleeve split at one end provided with a stationary jaw, a movable jaw sliding on the sleeve, a stationary collar, a spring secured between said collar and the movable jaw, and a set-screw for securing the collar and clamping the sleeve to the spindle, substantially as described.

10. As an article of manufacture, a yarn and bobbin holder consisting of a sleeve provided at one end with spring-arms for engaging a bobbin, the yarn-holding jaws below said arms, a spring for operating upon one of them, and clamping devices for securing said sleeve to the spindle, substantially as described.

LEONARD W. HUYCK.

Witnesses:
FRED F. CHURCH,
C. D. KIEHEL.